Patented Jan. 14, 1936

2,027,550

UNITED STATES PATENT OFFICE 2,027,550

CHLOROBUTADIENE

Granville A. Perkins, South Charleston, W. Va., assignor to Carbide and Carbon Chemicals Corporation, a corporation of New York No Drawing. Application August 15, 1931, Serial No. 557,427

9 Claims. (Cl. 260—162)

The invention relates to a new chloro derivative of 1,3 butadiene, and includes a process for making the new compound. The latter is a colorless liquid having a specific gravity of 0.945 at 21° C. and a boiling point of 56 to 59° C. It appears to have the structural formula

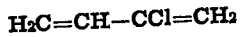

$H_2C=CH-CCl=CH_2$ and is probably 2-chlorobutadiene-1,3. The new compound undergoes spontaneous polymerization forming a homogeneous, amorphous, elastic solid which resembles caoutchouc in its physical properties, but which has the empirical composition of chlorobutadiene ($C_4H_5Cl$).

The compound can be prepared by the interaction of vinyl acetylene ($CH_2=CH-C=CH$) with hydrogen chloride in the presence of a catalyst comprising a cuprous compound. The process is illustrated by the following example:

Vinyl acetylene was prepared by dissolving 300 grams of calcium chloride, 300 grams of cuprous chloride and 70 cc. of concentrated hydrochloric acid in 600 cc. of water. Acetylene was bubbled through this solution until it became nearly colorless. Ammonium hydroxide was then slowly added to the solution until a precipitate formed, and a little hydrochloric acid was added to redissolve the precipitate. The solution was then ready for use. Acetylene was bubbled through the solution at the rate of about 10 liters per hour, and 2.5 grams per hour of vinyl acetylene, boiling at about 5° C., were recovered from the issuing gases by means of condensation and fractional distillation.

A strongly acid catalytic solution was then prepared by dissolving 100 grams of calcium chloride and 100 grams of cuprous chloride in a mixture composed of 200 cc. of concentrated hydrochloric acid and 50 cc. of water. This solution was agitated with powdered copper to reduce traces of cupric salts which were present as evidenced by the dark color of the solution. Forty-two grams of vinyl acetylene dissolved in 200 cc. of toluene was then added to this solution and the two layers were intimately mixed by shaking. Heat was evolved during this operation indicating that a rapid reaction took place. When the toluene layer no longer produced a yellow precipitate with ammoniacal cuprous chloride, it was separated and distilled in the presence of water. The fraction distilling at 52° to 55° C. under these conditions was found to be a chlorobutadiene, probably 2-chlorobutadiene-1,3.

The process may be varied by substituting other chlorides, such as ammonium, potassium, or sodium chloride for the calcium chloride, and the proportion of hydrochloric acid may be varied. It is essential to have the catalytic solution in the second step strongly acid. The cuprous chloride may be added as such, or it may be produced in the solution in any suitable manner; for example, by adding metallic copper and chlorine, cuprous oxide, or any cuprous compound which will yield solutions equivalent to those produced by hydrochloric acid and cuprous chloride. The catalytic solution may be used repeatedly, hydrogen chloride being passed in to replace that which is consumed in the reaction.

Solvents similar to toluene, particularly hydrocarbons such as xylene, kerosene or mineral oils, may be used, and the solvent may be repeatedly utilized in the process. The solvent used should be inert with respect to the reagents of the process and immiscible with water. The solvent may be dispensed with entirely and other means of removing the reaction product may be substituted. For example, the product may be removed by passing an excess of gaseous vinyl acetylene through the solution and isolating the chlorobutadiene by fractionating means from the issuing gaseous mixture.

I claim:

1. A process for making 2-chlorobutadiene-1,3 which comprises reacting vinyl acetylene with aqueous hydrogen chloride in the presence of a catalyst consisting essentially of cuprous chloride, and in the presence of a water-immiscible inert solvent in which the product is dissolved.

2. A process for making 2-chlorobutadiene-1,3 which comprises reacting a solution of vinyl acetylene in a water-immiscible inert solvent with an aqueous solution of hydrogen chloride in the presence of a water soluble cuprous compound, and thereafter isolating 2-chlorobutadiene-1,3 from said solution.

3. A process for making 2-chlorobutadiene-1,3 which comprises reacting vinyl acetylene with an aqueous solution of hydrogen chloride and cuprous chloride which contains a soluble chloride of an alkaline earth metal.

4. A process for making 2-chlorobutadiene-1,3 which comprises reacting vinyl acetylene with hydrogen chloride in the presence of a catalyst consisting of a water soluble cuprous compound and removing the product from the zone of reaction as it is formed by the aid of a water-immiscible inert solvent in which said product is dissolved.

5. A process for making 2-chlorobutadiene-1,3 which comprises reacting vinyl acetylene with an aqueous solution of hydrogen chloride and cuprous chloride which contains a soluble chloride of an alkaline earth metal, and removing the product of reaction as it is formed.

6. A process for making 2-chlorobutadiene-1,3 which comprises passing an excess of gaseous vinyl acetylene through an aqueous solution of hydrogen chloride and cuprous chloride which contains a soluble chloride of an alkaline earth metal, and isolating the product of reaction from the excess vinyl acetylene.

7. A process for making 2-chlorobutadiene-1,3 which comprises agitating a solution of vinyl acetylene in a water-immiscible inert solvent with an aqueous solution of hydrogen chloride and cuprous chloride which contains a soluble chloride of the group consisting of ammonium, alkali metals and alkaline earth metals, and thereafter isolating 2-chlorobutadiene-1,3 from said solvent.

8. A process for making 2-chlorobutadiene-1,3 which comprises agitating a solution of 1 part by weight of vinyl acetylene in about 5 parts by weight of a water-immiscible inert solvent with an aqueous solution composed of approximately 2.5 parts by weight each of hydrogen chloride, calcium chloride and cuprous chloride and about 3.5 parts by weight of water, and thereafter isolating 2-chlorobutadiene-1,3 from said solvent by fractional distillation.

9. A process for making 2-chlorobutadiene-1,3 which comprises agitating a solution of 1 part by weight of vinyl acetylene in about 5 parts by weight of toluene with an aqueous solution composed of approximately 2.5 parts by weight each of hydrogen chloride, calcium chloride and cuprous chloride and about 3.5 parts by weight of water, and thereafter isolating 2-chlorobutadiene-1,3 from said solvent by fractional distillation.

GRANVILLE A. PERKINS.